(12) United States Patent
Bhattiprolu et al.

(10) Patent No.: US 8,918,862 B2
(45) Date of Patent: Dec. 23, 2014

(54) MANAGING ACCESS TO STORAGE MEDIA

(75) Inventors: Sukadev Bhattiprolu, Beaverton, OR (US); Jujjuri Venkateswararao, Beaverton, OR (US); Haren Myneni, Beaverton, OR (US); Malahal R. Naineni, Beaverton, OR (US); Badari Pulavarty, Beaverton, OR (US); Chandra Seetharaman, Beaverton, OR (US); Narasimha Nageshrao Sharoff, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 13/222,467

(22) Filed: Aug. 31, 2011

(65) Prior Publication Data
US 2013/0055382 A1    Feb. 28, 2013

(51) Int. Cl.
G06F 12/14    (2006.01)
G06F 21/57    (2013.01)
G06F 21/78    (2013.01)

(52) U.S. Cl.
CPC ........ *G06F 21/78* (2013.01); *G06F 2221/2115* (2013.01); *G06F 21/572* (2013.01); *G06F 21/575* (2013.01)
USPC ........................................................ 726/19

(58) Field of Classification Search
CPC ....... G06F 21/31; G06F 21/57; G06F 21/572; G06F 21/575; G06F 21/34; G06F 21/35
USPC ........................ 762/19, 6; 713/155; 726/19, 6
See application file for complete search history.

(56) References Cited

U.S. PATENT DOCUMENTS

| | | | | |
|---|---|---|---|---|
| 6,862,681 | B2 * | 3/2005 | Cheston et al. | 713/2 |
| 7,072,691 | B2 * | 7/2006 | Cromer et al. | 455/558 |
| 7,711,942 | B2 * | 5/2010 | Wang et al. | 713/2 |
| 7,797,547 | B2 * | 9/2010 | Matsuoka et al. | 713/182 |
| 7,809,950 | B2 * | 10/2010 | Hawk et al. | 713/182 |
| 7,840,794 | B2 * | 11/2010 | Hashiguchi | 713/2 |
| 7,853,995 | B2 * | 12/2010 | Chow et al. | 726/10 |
| 7,930,527 | B2 * | 4/2011 | Matsuoka et al. | 713/1 |
| 8,166,560 | B2 * | 4/2012 | Chebolu et al. | 726/27 |
| 8,250,626 | B2 * | 8/2012 | Rhoades et al. | 726/2 |
| 8,339,631 | B2 * | 12/2012 | Lee et al. | 358/1.14 |
| 8,375,220 | B2 * | 2/2013 | Prakash et al. | 713/187 |
| 8,566,600 | B2 * | 10/2013 | Challener et al. | 713/182 |
| 8,775,783 | B2 * | 7/2014 | Streuter et al. | 713/2 |
| 2003/0065940 | A1 * | 4/2003 | Brezak et al. | 713/201 |
| 2003/0097585 | A1 * | 5/2003 | Girard | 713/200 |
| 2005/0091522 | A1 * | 4/2005 | Hearn et al. | 713/200 |
| 2006/0041932 | A1 * | 2/2006 | Cromer et al. | 726/6 |
| 2006/0064752 | A1 * | 3/2006 | Wang et al. | 726/19 |
| 2006/0075476 | A1 * | 4/2006 | Hajji et al. | 726/6 |
| 2007/0061561 | A1 * | 3/2007 | Hashiguchi | 713/2 |
| 2007/0177769 | A1 * | 8/2007 | Motoyama et al. | 382/115 |

(Continued)

*Primary Examiner* — Eleni Shiferaw
*Assistant Examiner* — Nelson Scott Giddins
(74) *Attorney, Agent, or Firm* — Lieberman & Brandsdorfer, LLC

(57) ABSTRACT

Embodiments of the invention relate to password management of one or more data storage devices. A set of passwords are employed to manage access to the storage devices, with authentication of both passwords enabling access to the subject storage device(s) for read and/or write operation privileges. The first password is known by the user and is used as an initial input string. The second password is not known by the user and is authenticated with the subject storage device(s) through BIOS and without input from the user.

12 Claims, 9 Drawing Sheets

(56) References Cited

U.S. PATENT DOCUMENTS

| | | | |
|---|---|---|---|
| 2008/0104409 A1* | 5/2008 | Matsuoka et al. | 713/178 |
| 2009/0222909 A1* | 9/2009 | Challener et al. | 726/18 |
| 2009/0249014 A1* | 10/2009 | Obereiner et al. | 711/164 |
| 2009/0276623 A1* | 11/2009 | Jevans et al. | 713/155 |
| 2009/0313478 A1* | 12/2009 | Springfield et al. | 713/184 |
| 2010/0082966 A1* | 4/2010 | Lu et al. | 713/2 |
| 2010/0162373 A1* | 6/2010 | Springfield et al. | 726/6 |
| 2010/0191947 A1* | 7/2010 | Shin | 713/2 |
| 2011/0055534 A1* | 3/2011 | Chung | 713/2 |
| 2011/0126023 A1* | 5/2011 | Wang et al. | 713/182 |
| 2011/0154023 A1* | 6/2011 | Smith et al. | 713/155 |
| 2011/0161666 A1* | 6/2011 | Gladwin et al. | 713/164 |
| 2011/0246757 A1* | 10/2011 | Prakash et al. | 713/2 |
| 2012/0017271 A1* | 1/2012 | Smith et al. | 726/19 |
| 2012/0254956 A1* | 10/2012 | Fletcher | 726/5 |
| 2013/0055382 A1* | 2/2013 | Bhattiprolu et al. | 726/19 |

* cited by examiner

MANAGING ACCESS TO STORAGE MEDIA

BACKGROUND

1. Technical Field

The present invention relates to a method and system for management of access to data storage. More specifically, the invention relates to a system and method that enhances security pertaining to data storage.

2. Description of the Prior Art

Access to disk storage systems, or storage media, both hereinafter referred to as storage, is necessary to support both read and write operations in a computer system. Different security elements are employed for controlling access to storage to ensure that read and write operations associated with unauthorized users is not supported. For example, desktop and laptop computers are known for having password protected hard drives. A user has to submit a valid password to the hard drive in order to access the hard disk and to support read and write operations to the hard disk. Accordingly, the password is a single level security element between the user and the hard drive.

With respect to the security of data on the hard drive, the single level of security is maintained via a password held by the user. Authentication is limited to a single element, the password. If the password becomes unavailable or forgotten, data in the storage becomes unrecoverable. More specifically, the single level of authentication includes a single level of failure without a backup or recovery plan for the password in the event of an unavailable or forgotten password.

SUMMARY OF THE INVENTION

This invention comprises a method, system, and apparatus for password management of one or more storage devices.

In one aspect of the invention, a method is provided for managing secured access to a storage device. More in response to a logon that includes both a username and an associated first password, BIOS requests a storage identifier that is associated with both a storage device and characterizing data of the username and the first password. The BIOS requests a first authentication that includes the storage device identifier together with the username and the first password. After the first authentication has been validated, a second password is received by the BIOS. The second password is associated with the storage device. The BIOS then requests a second authentication which includes an authentication by the BIOS of the second password with the storage device. The second authentication is validated by the storage device, which includes granting access to the storage device if the second authentication passed.

In another aspect, a computer program product is provided for use as a service for a storage device. The computer program product includes a computer-readable storage medium having computer readable program code embodied thereon, which when executed causes a computer to implement a method for management of secured access to the storage device. More specifically, the computer program product supports BIOS requesting a storage identifier associated with a storage device to support access to the storage device. The BIOS request includes characterizing data in the form of a username and a first password. Computer readable program code is configured to support the BIOS requesting a first authentication, which includes authentication of the storage media identifier with the username and the first password. Computer readable program code is provided to receive a second password after the first authentication has passed. The second password is associated with the storage device. Computer readable program code is also provided to support the BIOS requesting a second authentication, which includes authentication by the BIOS of the returned second password with the storage device. In addition, computer readable program code is provided to support the storage device validating the second authentication, which includes granting access to the storage device in response to passing the second authentication of the second password.

In yet another aspect, a system is provided with a processor in communication with memory that contains BIOS. A functional unit is provided in communication with the BIOS and includes tools to support password management of the storage device(s). The functional unit includes a log manager which is in communication with the BIOS. The log manager characterizes data of a username and a first password. The BIOS requests a storage identifier associated with a storage device and the characterizing data. A first authentication manager is provided by the functional unit in communication with the BIOS. The first authentication manager functions to authenticate the storage identifier with the username and the first password. The BIOS is configured to receive a second password associated with the storage device in response to a first passing notification received from the first authentication manager. A second authentication manager is provided by the functional unit in communication with the BIOS. The second authentication manager functions to authenticate the received second password with the storage device. A validation manager is provided by the functional unit in communication with the second authentication manager. The validation manager functions to validate the second authentication and to grant access to the storage device in response to a pass of the second authentication of the second password.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
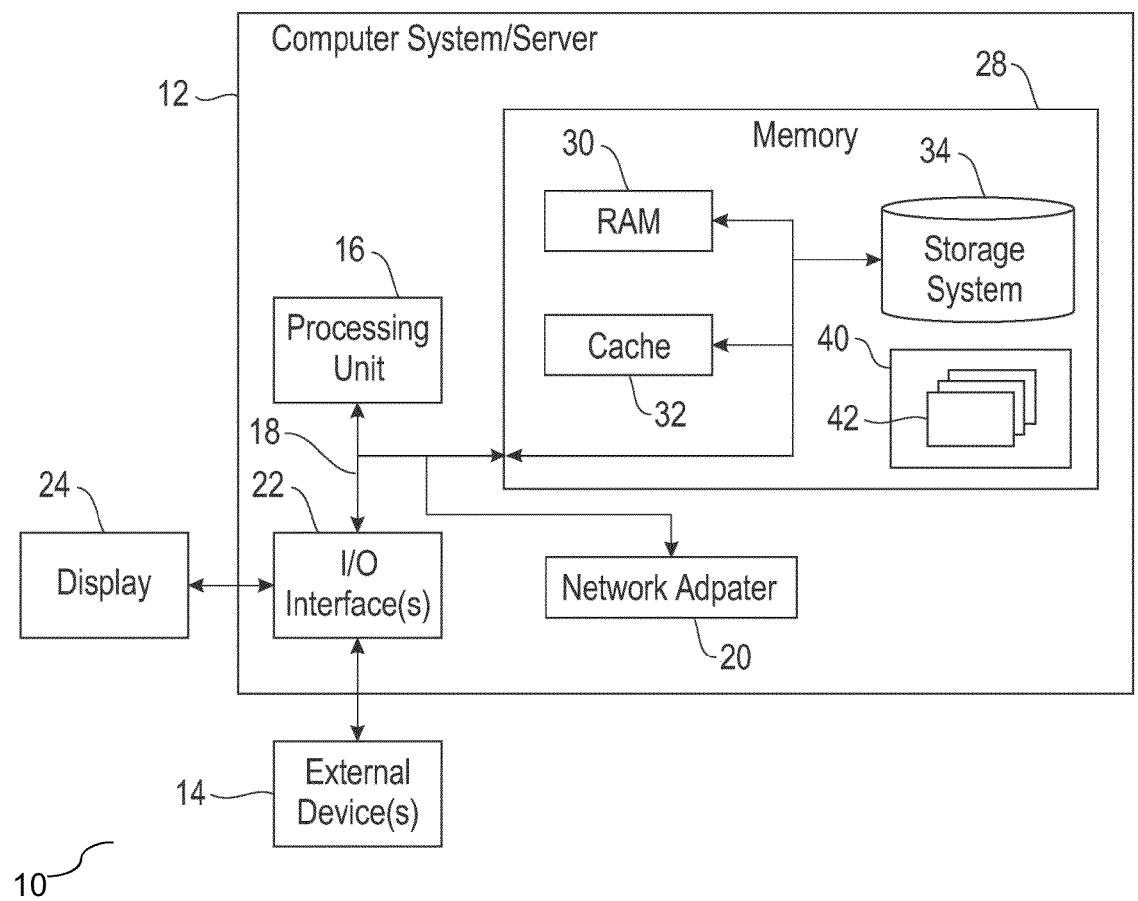
FIG. 1 depicts a cloud computing node according to an embodiment of the present invention.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools, modules, and/or managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove. In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16). Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating systems, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14), such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
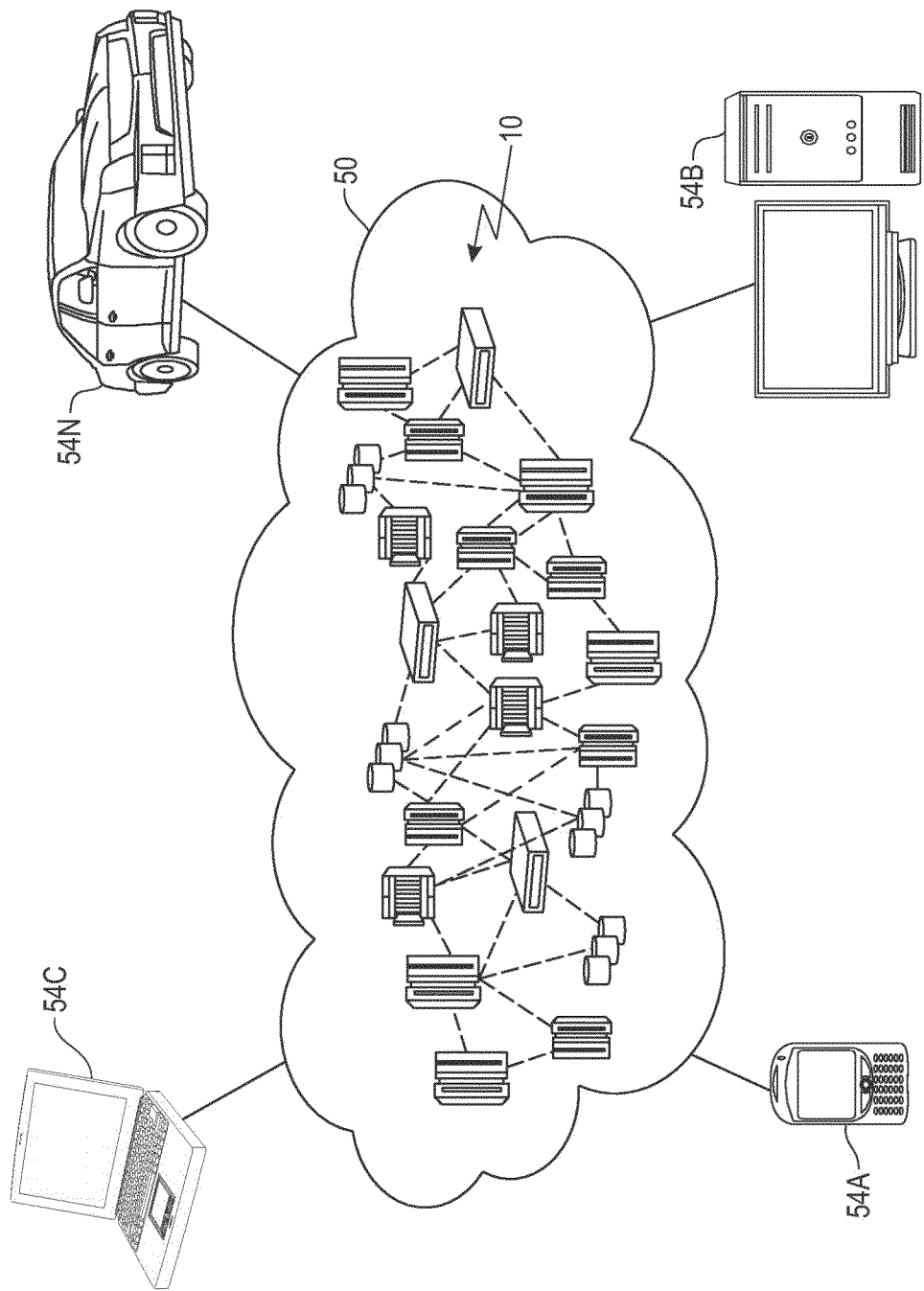
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A)-(54N) shown in FIG. 2 are intended to be illustrative only and that computing nodes (10) and cloud computing environment (50) can communicate with any type of computerized device over any type of network and/or network addressable connection (e.g., using a web browser).

Figure 3:
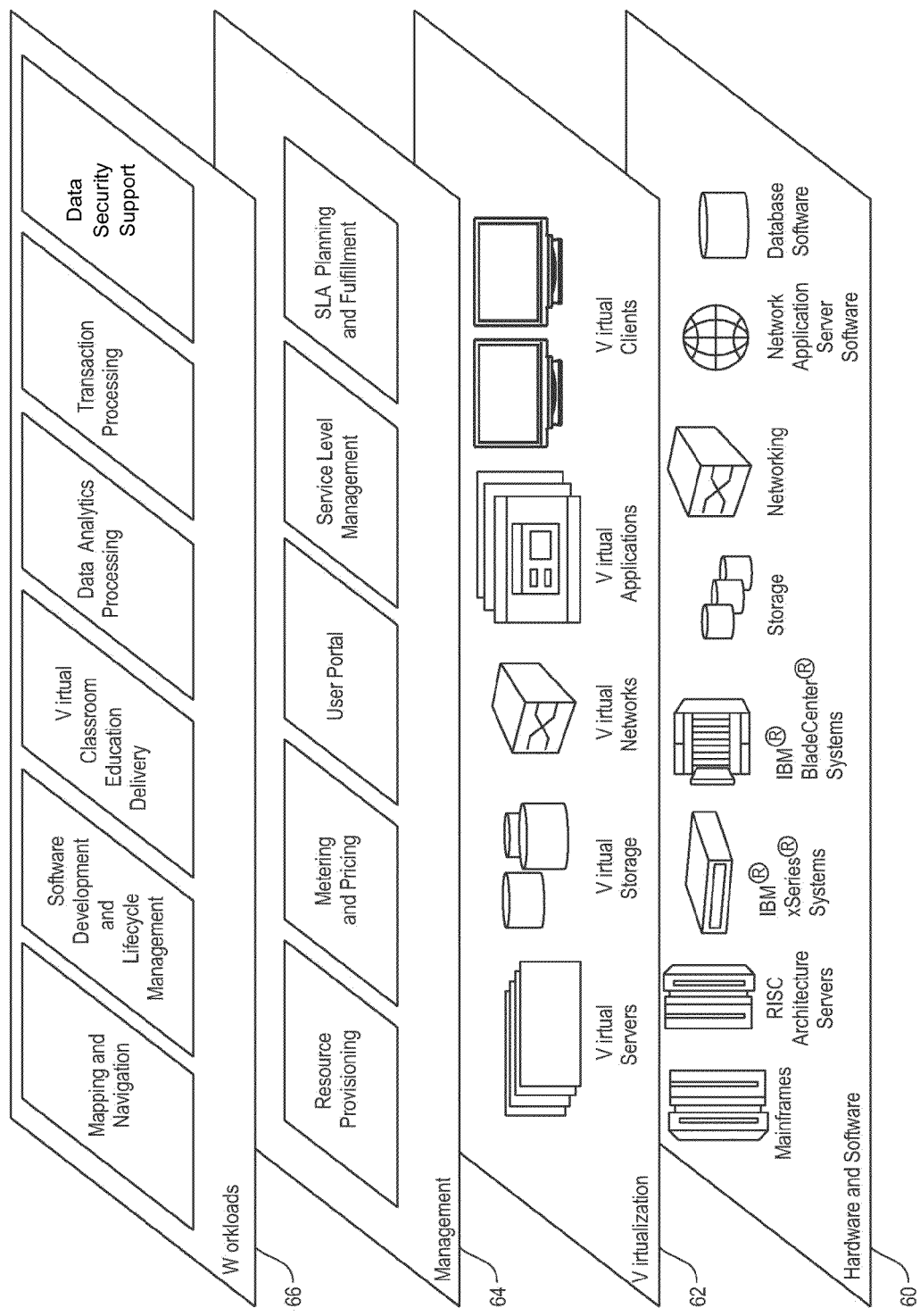
FIG. 3 depicts abstraction model layers according to an embodiment of the present invention.

Referring now to FIG. 3, a set of functional abstraction layers provided by cloud computing environment (50) is shown. It should be understood in advance that the components, layers, and functions shown in FIG. 3 are intended to be illustrative only and embodiments of the invention are not limited thereto. As depicted, the following layers and corresponding functions are provided: hardware and software layer (60), virtualization layer (62), management layer (64), and workload layer (66). The hardware and software layer (60) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers; virtual storage; virtual networks, including virtual private networks; virtual applications and operating systems; and virtual clients.

In one example, management layer (64) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer includes, but is not limited to: mapping and navigation; software development and lifecycle management; virtual classroom education delivery; data analytics processing; operation processing; and maintenance of data security to support access to storage media within the cloud computing environment.

In the shared pool of configurable computer resources described herein, hereinafter referred to as a cloud computing environment, access to storage devices may be shared among users within multiple data centers, also referred to herein as data sites. A series of mechanisms are provided within the shared pool to manage access to storage devices for select users. Two levels of authentication are employed with respect to data storage access consent management. More specifically, the authentications employ the functionality of the basic input output system, hereinafter referred to as BIOS, of at least one machine to assist with access control decisions of one or more data storage devices. BIOS is a set of computer instructions in memory that enables a computer to start the operating system and to communicate with various devices in the system, including, but not limited to a keyboard, visual display, persistent storage, serial communication(s), etc. In one embodiment, BIOS is placed in a read only chip to ensure that the BIOS will always be available and not subject to damage associated with disk failure.

It is recognized in the art that a storage device, such as a disk drive, is employed to store data. A read operation reads data from the storage device, i.e. disk drive, and a write operation changes data or takes data stored elsewhere and stores the changed data on the storage device. Two levels of security are provided to support read and write operations with the storage device. More specifically, a first password is associated with the user and a second password is associated with the storage device. In one embodiment, the first and second passwords are two separate and distinct passwords, and in another embodiment, the first and second passwords may be the same. The first password is known to the user and employed directly by the user. The second password is unknown to the user. More specifically, the second password is gathered by the BIOS and employed as a second level of security for access to the storage device. Accordingly, the first and second passwords are separated, as well as the tools employed for separate authentication of the first and second passwords.

Figure 4:
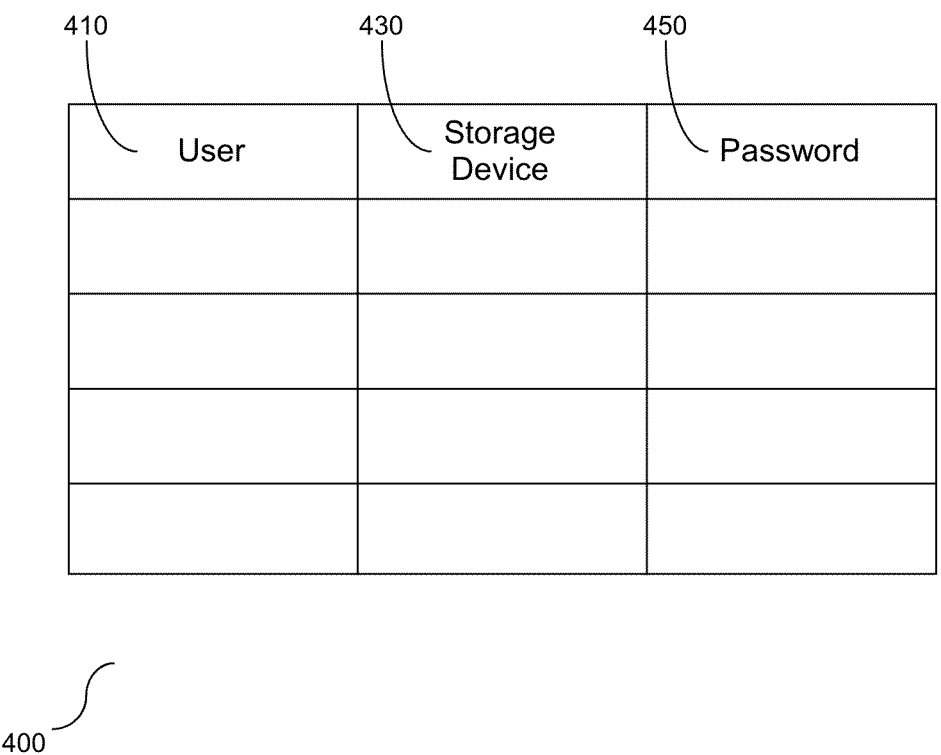
FIG. 4 is a block diagram illustrating one form of a record.

An external site maintains a record of one or more users and storage devices to which the user has read and write operation privileges. FIG. 4 is a block diagram (400) of the record. As shown, the record is provided with three fields, including the user (410), a storage device (430), and a password for the storage device (450). Each storage device has an associated identifier. The storage device field (430) includes the identifier of the associated data storage. In one embodiment, the identifier is a string of characters, and may be in the form of the serial number provided by a storage device manufacture. The user field (410) is an identifier for the user, and more specifically is an indicator that the user has read and/or write operation privileges to the storage. In one embodiment, the user field includes a string of characters. The password field (450) is a password associated with the storage device. In one embodiment, the password field includes a string of characters. As shown, a user is associated with a storage device, and a corresponding second password is associated with the storage device. In one embodiment, there may be a one-on-one correspondence between each user and each listed storage device. Similarly, in another embodiment, more than one user may be associated with and provided access privileges to the same storage device. Different methods and tools may be employed for populating the fields shown in FIG. 4. In one embodiment, a system administrator may populate the fields. Similarly, in another embodiment, the fields may be automatically populated when the user connects to the network. Accordingly, regardless of how the fields are populated, the record shown herein maintains the assignment of users to storage devices, and associates a second password for access by the respective users to the storage devices.

Figure 5:
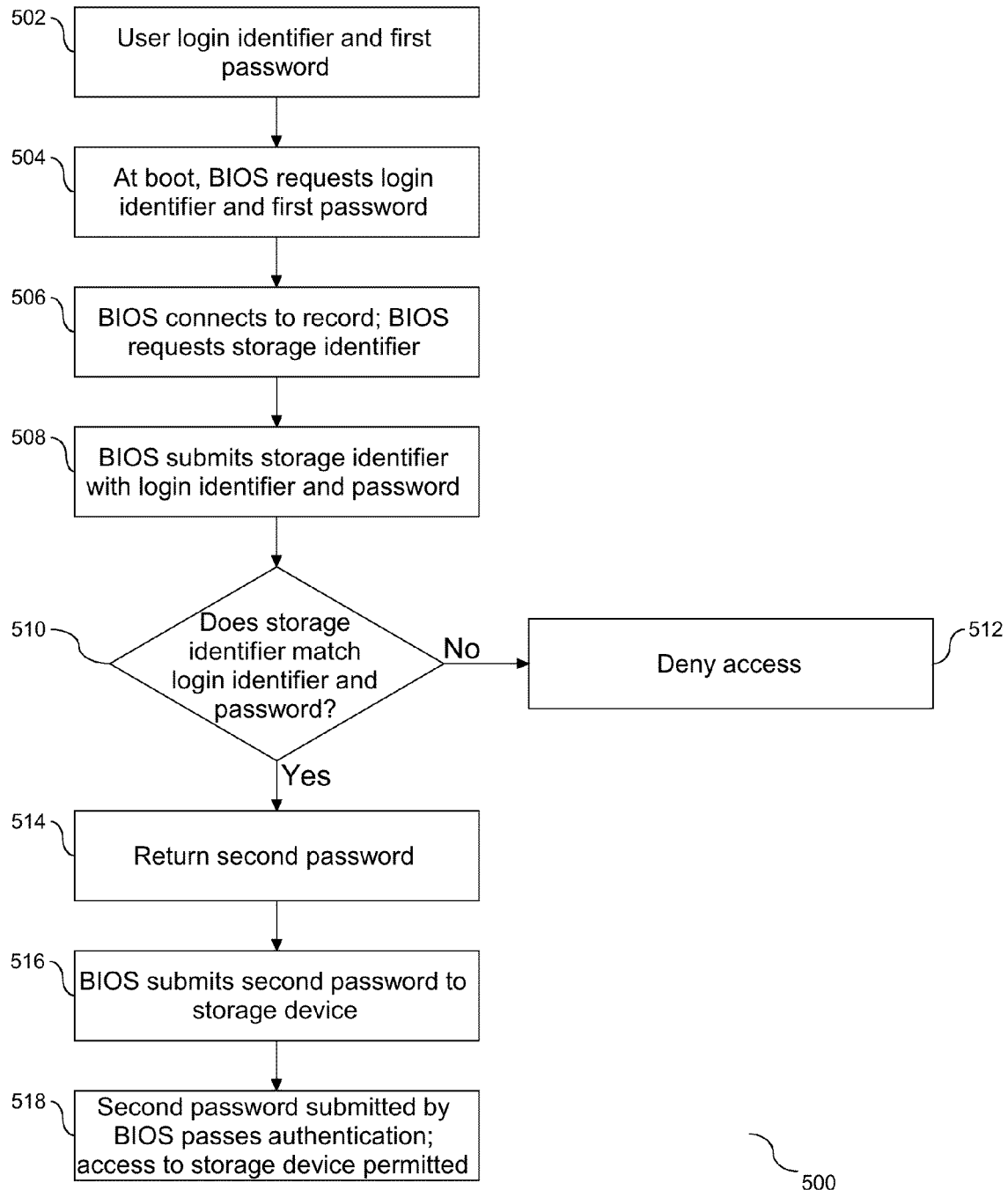
FIG. 5 is a flow chart illustrating a process for logging into a client workstation, including authentication of access to a data storage device.

FIG. 5 is a flow chart (500) illustrating a process for logging into a client workstation with network connectivity, including authentication of access to data storage. As shown, a user is provided with a login identifier and a first password (502). The login identifier and the first password are known to the user. In one embodiment, the login identifier and first password are used to logon to the client workstation at the time of boot. As shown at step (504), the BIOS requests both the user login identifier and the first password at the time of boot of the client workstation. Through a network connection, the BIOS connects to a server or other machine or device that either retains the record or is in communication with data storage that retains the record and requests a storage media identifier (506). As described above, the record identifies users by a user identifier and storage devices by respective storage device identifiers, with each pairing of user identifiers and storage device identifiers having an associated second password.

Following step (506), the BIOS submits the requested storage media identifier together with the user login identifier and first password to the server (508). More specifically, the submission at step (508) is followed with determining if the requested storage media identifier and the pairing of the user login identifier and first password match (510). A negative response to the determination at step (510) is followed by denial of access to the storage device (512). Conversely, a positive response to the determination at step (510) is followed by returning a second password to the BIOS with the second password regulating access to the storage device (514). Accordingly, authentication of the user login information with the server and associated record is a first level of authentication.

As indicated above, there are two levels of authentication with respect to the storage device. The first level pertains to storage of the storage media password local to or in communication with the server. The second level pertains to storage of the second password local to the storage device. More specifically, the second password is retained in two locations, one location being the record illustrated in FIG. 4 and a second location being the storage device itself. In one embodiment, the record in the second location is only accessible by the storage device for comparison purposes. Until the second level of authentication is passed, access to the storage device is not granted. Following step (514), the BIOS submits the second password to the storage device (516) in order to request read and write operation privileges thereto. As noted above, the record shown in FIG. 4 includes a storage device identifier with a second password, with the storage device associated with at least one user. The BIOS receives the second password from the record. If the second password as submitted by the BIOS to the storage device passes authentication with the storage device, access to the storage device is permitted (518). Accordingly, authentication of the second password with the storage device is the second level of authentication.

The authentication process illustrated in FIG. 5 manages access to the storage device without requiring submission of the second password by a secondary source or entity. As shown in FIGS. 4 and 5, two passwords are employed for authentication to the storage device, with the first password provided by a user and the second password stored at an external location and accessible by the client workstation BIOS. Access entry to the storage device is communicated to the BIOS and retained in the external record. At the same time, access is not granted until the second password which is submitted by the BIOS to the storage device is authenticated. Provision of the second password to the BIOS is based upon management of the record illustrated in FIG. 4. Access may be enabled by an entry in the record, and at the same time withdrawn by removal of one or more entries from the record. There are three elements employed in the authentication process demonstrated in FIG. 5 and supported by the record shown in FIG. 4, including authentication of a storage device identifier with a user logon, and authentication of a storage device password referred to herein as the second password. Both of the authentication processes employ the BIOS local to the client workstation, and eliminate direct user knowledge or access to the second password.

For various reasons, security of the storage device may be required. For example, in a corporate environment it may be desirable or necessary to restrict data access to a selection of employees. At the same time, upon termination of employment, removal of a record will eliminate access of the terminated employee to the storage media. The restriction(s) to the storage media is all enabled or disabled without knowledge or access by the user. As described above, a remote record is maintained with an association of the storage device identifier with a user, and attachment of the second password to the association. Removal or addition of a user to the record can disable or enable user access to the storage, respectively, without action by the user. In one embodiment, access settings to the storage device(s) can be modified only when the second password has been authenticated. Similarly, in another embodiment, one or more access settings to the storage device(s) is managed by amending the record.

Figure 6:
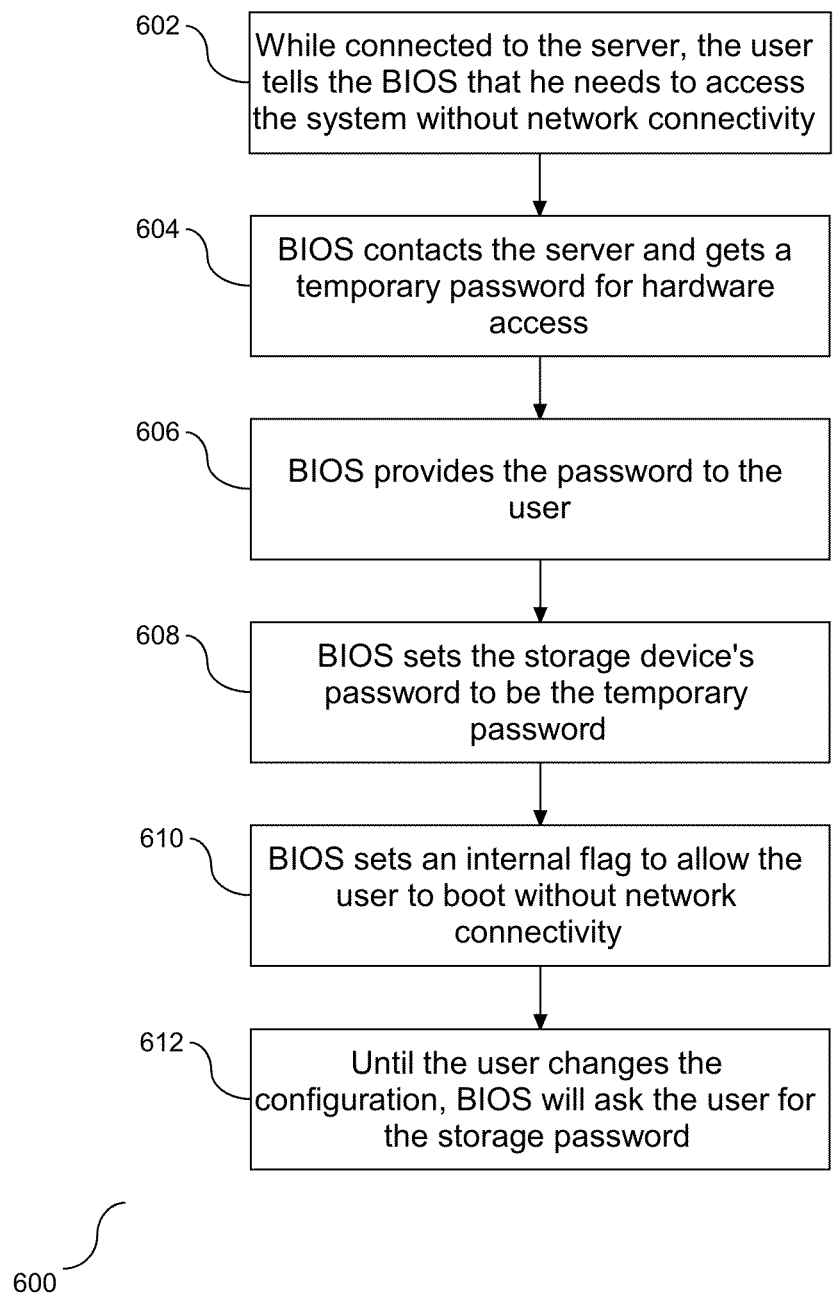
FIG. 6 is a flow chart illustrating a process for setting up protocols to enable access to password protected data storage without network connectivity.

As shown in FIG. 5, a client machine with network connectivity may invoke the authentication process for access to data storage. In one embodiment, the authentication process may be invoked by the client machine without network connectivity. FIG. 6 is a flow chart (600) illustrating a process for a user to set up protocols to enable access to password protected data storage without network connectivity. While connected to the server, a user in communication with a computing machine communicates with the BIOS with the communication indicating that access to the system is necessary without network connectivity (602). In response to the communication at step (602), the BIOS contacts the server and receives a temporary password for hardware access (604), and provides the password to the user in communication with the computing machine (606). In addition, the BIOS sets a password of the storage device to be a temporary password (608) and also sets an internal flag to allow the computing machine to boot without network connectivity (610). The temporary password remains the password between the computing machine and the storage device until the user changes the configuration. More specifically, the BIOS will request the storage password in the form of the temporary password (612), until the configuration of the computing machine is changed. Accordingly, as shown herein access to the storage device is supported without network connectivity by use of a temporary password.

Figure 7:
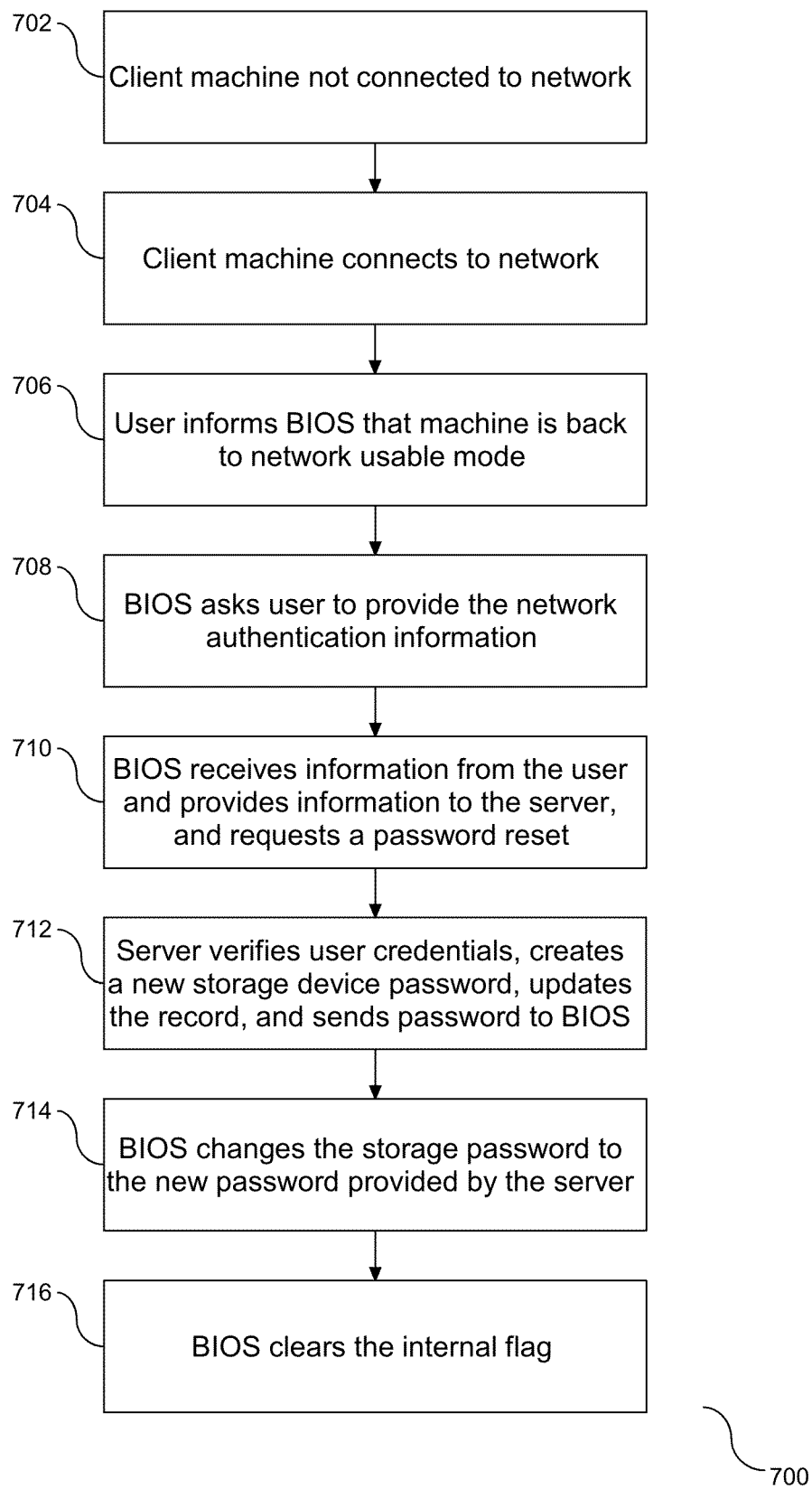
FIG. 7 is a flow chart illustrating a process of a client machine re-connecting to the network following disconnect from the network.

As shown in FIG. 6, the established temporary password remains the password for access to the data storage until the configuration of the computing machines is changed. FIG. 7 is a flow chart (700) illustrating a process of a client machine re-connecting to the network following disconnect from the network, and how this affects access to the data storage. As demonstrated in FIG. 6, the client machine is not connected to the network (702). At such time as the client machine connects to the network (704), the user in communication with the client machine communicates to the BIOS that the client machines is in a network usable mode (706). In response to receipt of the communication at step (706), the BIOS request network authentication information (708) and in response to receipt thereof, the BIOS provides the authentication information to the server and requests a password reset (710). Following receipt by the server of the password reset, the server verifies the credentials of the user, creates a network storage device password, updates the record with the new password, and forwards the new password to the BIOS (712). The BIOS then replaces the prior storage password with the new storage password as created by the server (714). Finally, the BIOS clears the internal flag (716) that was set at step (610). In one embodiment, the clearing of the flag ensure that the client machine cannot boot without network connectivity. Accordingly, the client machine may re-connect with the network following a disconnect therefrom, and based upon authentication information have the storage password reset to re-establish connectivity to the data storage.

Figure 8:
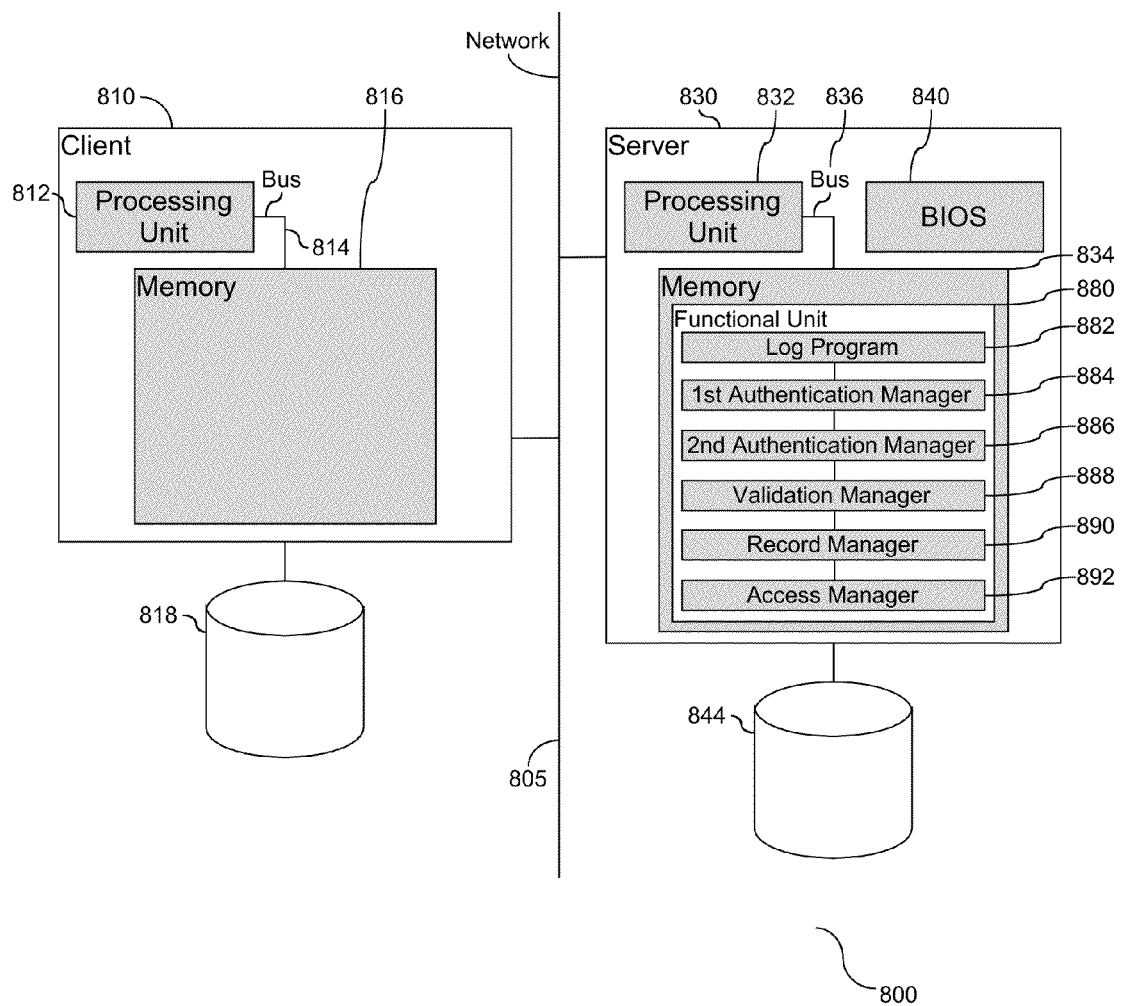
FIG. 8 is a block diagram illustrating tools embedded in a computer system to support management of access privileges to a storage device.

Management of one or more storage devices and associated access privileges may take place directly between a client machine and a server and/or designated data storage device. FIG. 8 is a block diagram (800) illustrating tools embedded in a computer system to support management of access privileges to storage devices. For illustrative purposes, a computer system is provided with a client machine (810) in communication with a server (830) across a network (805). The client machine (810) is provided with a processing unit (812) in communication with memory (816) across a bus (814). In one embodiment, client machine (810) is in communication with local data storage (818).

The client machine (810) is shown in communication with the server (830) across the network (805). In one embodiment, the server (830) is in a data center in a shared pool of configurable resources. The server (830) is provided with a processing unit (832) in communication with memory (834) and BIOS (840) across a bus (836). As shown herein, the server (830) is in communication with at least one storage device (844). In one embodiment, the server (830) may be in communication with additional storage devices, and/or additional data centers. The storage device (844) is configured to support read and/or write operations.

A functional unit (880) is provided in communication with memory (834) to support access management to the storage devices, and more specifically for managing read and/or write privileges to the storage devices. As shown, the functional unit (880) is provided with a log program (882), a first authentication manager (884), a second authentication manager (886), a validation manager (888), a record manager (890), and an access manager (892). The log program (882) characterizes data of the username and password, and communicates with the BIOS to request a storage identifier associated with both a storage device and the characterizing data. The first authentication manager (884) is provided in communication with the BIOS (840). More specifically, the first authentication manager (884) functions to authenticate the storage identifier with both the username and the first password. The first authentication manager (884) issues a first passing notification when the authentication is validated. Accordingly, the first part of managing access to the storage device authenticates the storage identifier with the first password.

The BIOS (840) receives a second password associated with the storage device responsive to the validation by the first authentication manager (884). A second authentication manager (886) is also provided in communication with the BIOS (840). More specifically, the second authentication manager (886) functions to authenticate the received second password with one of the storage devices, and more specifically, to authenticate the second password with the storage device to which the second password is associated. A validation manager (888) is provided in communication with the second authentication manager (886). The validation manager (888) functions to validate the second authentication, and in response to the validation to grant access to the storage device. More specifically, the validation manager (888) grants access to the designated storage device in response to a pass of the second authentication of the second password. Conversely, the validation manager (888) denies access to the designated storage device in response to a failure of the second authentication of the second password. Accordingly, the second part of managing access to the storage device authenticates the storage device with the second password.

To support the multiple tiered authentication system shown herein, a record (894) is provided to store the second password, and in one embodiment includes the storage media identifier associated with the second password. In one embodiment, the record (894) is remotely located from both the subject storage device and the BIOS (840). A record manager (890) is provided in communication with the record (894) to amend the record (894) and to change access privileges to the storage device(s). More specifically, the record manager (890) may remove access entry by a user associated with the username to the storage device by removing the username from the record (894). Similarly, the record manager (890) may enable access entry by a second user associated with the second username to the storage device by adding the second username to the record (894). In addition to the record manager (890), an access manager (892) is provided in communication with the record (894). The access manager (892) functions to change settings associated with access to storage after access has already been granted. For example, the access manager (894) enables access settings to be modified once access has been authorized. Accordingly, the record manager (890) and the access manager (892) function as tools to manage access related issues associated with the record (894).

As identified above, the log program (882), first authentication manager (884), second authentication manager (886), validation manager (888), record manager (890), and access manager (892), hereinafter referred to as tools, function as elements to support the password management with respect to a data storage device. The tools (882)-(892) are shown residing in memory (834) local to the server (830). However, the tools (882)-(892) may reside as hardware tools external to memory (834), or they may be implemented as a combination of hardware and software. Similarly, in one embodiment, the tools (882)-(892) may be combined into a single functional item that incorporates the functionality of the separate items. As shown herein, each of the tools (882)-(892) are shown local to the server (830). However, in one embodiment they may be collectively or individually distributed across a network or multiple machines and function as a unit to evaluate hardware performance. Accordingly, the managers and director may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
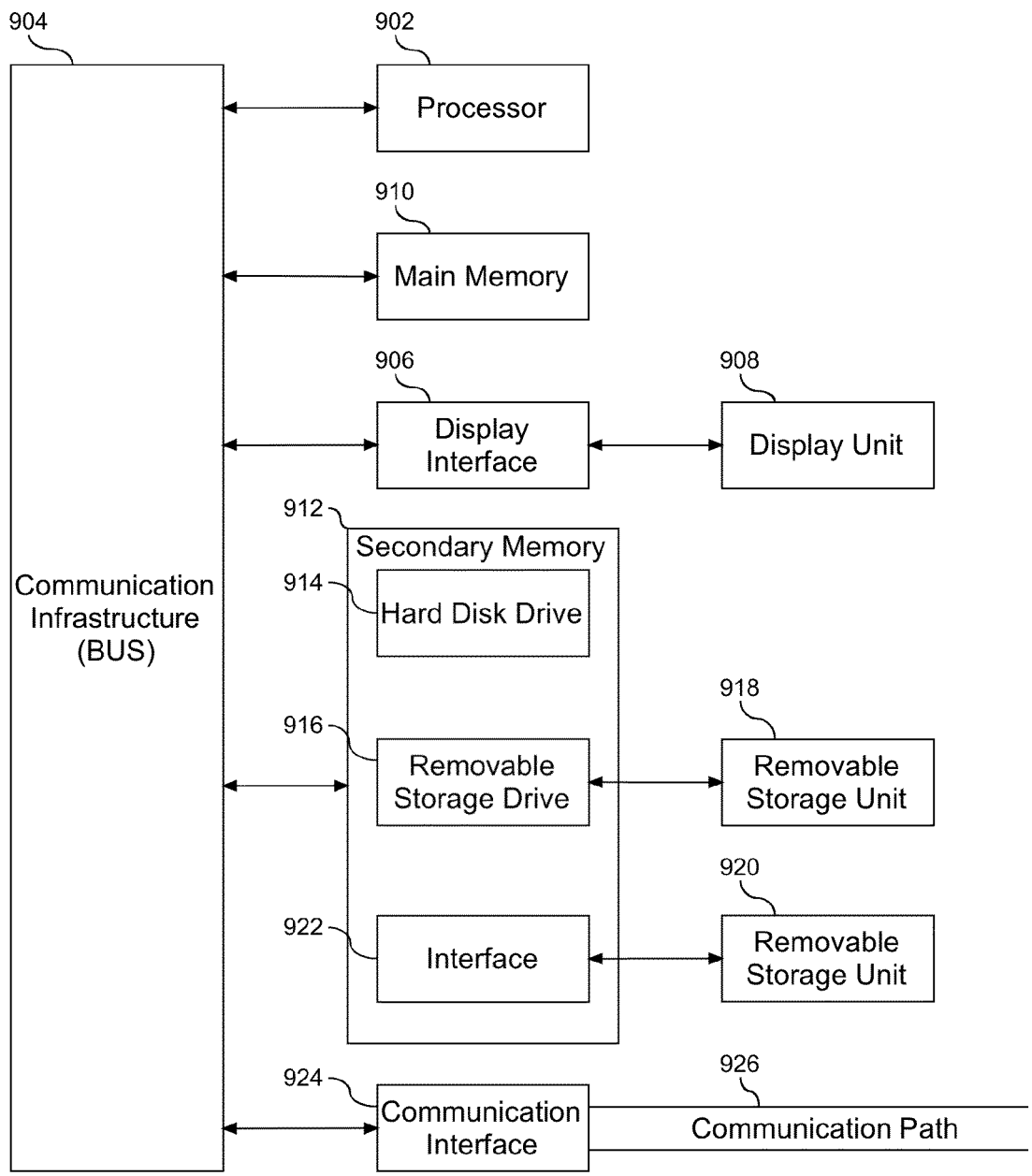
FIG. 9 is a block diagram showing a system for implementing an embodiment of the present invention.

Referring now to the block diagram of FIG. 9, additional details are now described with respect to implementing an embodiment of the present invention. The computer system includes one or more processors, such as a processor (902). The processor (902) is connected to a communication infrastructure (904) (e.g., a communications bus, cross-over bar, or network).

The computer system can include a display interface (906) that forwards graphics, text, and other data from the communication infrastructure (904) (or from a frame buffer not shown) for display on a display unit (908). The computer system also includes a main memory (910), preferably random access memory (RAM), and may also include a secondary memory (912). The secondary memory (912) may include, for example, a hard disk drive (914) and/or a removable storage drive (916), representing, for example, a floppy disk drive, a magnetic tape drive, or an optical disk drive. The removable storage drive (916) reads from and/or writes to a removable storage unit (918) in a manner well known to those having ordinary skill in the art. Removable storage unit (918) represents, for example, a floppy disk, a compact disc, a magnetic tape, or an optical disk, etc., which is read by and written to by removable storage drive (916). As will be appreciated, the removable storage unit (918) includes a computer readable medium having stored therein computer software and/or data.

In alternative embodiments, the secondary memory (912) may include other similar means for allowing computer programs or other instructions to be loaded into the computer system. Such means may include, for example, a removable storage unit (920) and an interface (922). Examples of such means may include a program package and package interface (such as that found in video game devices), a removable memory chip (such as an EPROM, or PROM) and associated socket, and other removable storage units (920) and interfaces (922) which allow software and data to be transferred from the removable storage unit (920) to the computer system.

The computer system may also include a communications interface (924). Communications interface (924) allows software and data to be transferred between the computer system and external devices. Examples of communications interface (924) may include a modem, a network interface (such as an Ethernet card), a communications port, or a PCMCIA slot and card, etc. Software and data transferred via communications interface (924) are in the form of signals which may be, for example, electronic, electromagnetic, optical, or other signals capable of being received by communications interface (924). These signals are provided to communications interface (924) via a communications path (i.e., channel) (926). This communications path (926) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (910) and secondary memory (912), removable storage drive (916), and a hard disk installed in hard disk drive (914).

Computer programs (also called computer control logic) are stored in main memory (910) and/or secondary memory (912). Computer programs may also be received via a communication interface (924). Such computer programs, when run, enable the computer system to perform the features of the present invention as discussed herein. In particular, the computer programs, when run, enable the processor (902) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the system can be configured to support more than one user having access to the same storage by adding a record to the data in the server. Accordingly, the scope of protection of this invention is limited only by the following claims and their equivalents.

We claim:

1. A method comprising:
    initiating a logon by providing characterizing data of a username and a first password, including Basic Input/Output System (BIOS) in communication with the logon requesting a storage identifier associated with a storage device and the characterizing data;
    requesting by the BIOS a first authentication, including authentication of the storage media identifier with the username and the first password received from a first entity;
    receiving a second password from a second entity following a passing of the first authentication, wherein the second password is associated with the storage device, and wherein the second entity is separate from the first entity;
    storing the second password in a record remotely located from the storage device and the BIOS, wherein the record pertaining to the username includes the storage media identifier associated with the second password;
    requesting by the BIOS a second authentication, including authentication by the BIOS of the second password associated with the storage device; and
    validating by the storage device the second authentication, including granting access to the storage device in response to passing the second authentication of the second password.

2. The method of claim 1, wherein the record pertaining to the username includes the storage media identifier associated with the second password.

3. The method of claim 1, further comprising amending the record to change access privileges to the storage device, including removing the username from the record to remove access entry by a user associated with the username to the storage device.

4. The method of claim 1, further comprising amending the record to add a second username to the record to enable access entry by a second user associated with the second username to the storage device.

5. The method of claim 1, further comprising changing a setting associated with access to the storage media following granting of access to the storage media.

6. A computer program product delivered as a service, the computer program product comprising a non-transitory computer readable storage medium having computer readable program code embodied therewith, the computer readable program code comprising:
    computer readable program code configured to support Basic Input/Output System (BIOS) requesting a storage identifier associated with a storage device in support of access to the storage device, the request including characterizing data of a username and a first password received from a first entity;
    computer readable program code configured to support the BIOS requesting a first authentication, including authentication of the storage media identifier with the username and the first password;
    following a passing of the first authentication, computer readable program code configured to receive a second password from a second entity, wherein the second password is associated with the storage device, and wherein the second entity is separate from the first entity;
    computer readable program code to store the second password in a record remotely located from the storage device and the BIOS, wherein the record pertaining to the username includes the storage media identifier associated with the second password;
    computer readable program code configured to support the BIOS requesting a second authentication, including authentication by the BIOS of the second password associated with the storage device; and
    computer readable program code configured to support the storage device validating the second authentication, including granting access to the storage device in response to passing the second authentication of the second password.

7. The computer program product of claim 6, further comprising computer readable program code to amend the record to change access privileges to the storage device, including removing the username from the record to remove access entry by a user associated with the username to the storage device, and adding a second username to the record to enable access entry by a second user associated with the second username to the storage device.

8. The computer program product of claim 6, further comprising computer readable program code to change a setting associated with access to the storage media following granting of access to the storage media.

9. A system comprising:
    a processor in communication with memory that contains Basic Input/Output System (BIOS);
    a functional unit in communication with the BIOS, the functional unit comprising:
        a log manager to characterize data of a username and a first password received from a first entity, and the BIOS to request a storage identifier associated with a storage device and the characterizing data;
        a first authentication manager in communication with the BIOS, the first authentication manager to authenticate the storage identifier with the username and the first password;
        the BIOS to receive a second password from a second entity associated with the storage device in response to a first passing notification received from the first authentication manager, wherein the second entity is separate from the first entity;
        the record to store the second password remotely located from the storage device and the BIOS and through a network connection, wherein the record pertaining to the username includes the storage media identifier associated with the second password;
        a second authentication manager in communication with the BIOS, the second authentication manager to authenticate the received second password associated with the storage device; and
        a validation manager in communication with the second authentication manager, the validation manager to validate the second authentication and to grant access to the storage device in response to a pass of the second authentication of the second password, and to deny access to the storage device in response to a failure of the second authentication of the second password.

10. The system of claim 9, wherein the record pertaining to the username includes the storage media identifier associated with the second password.

11. The system of claim 9, further comprising a record manager to amend the record to change access privileges to the storage device, including removal of the username from the record to remove access entry by a user associated with the username to the storage device, and addition of a second username to the record to enable access entry by a second user associated with the second username to the storage device.

12. The system of claim 9, further comprising an access manager to change a setting associated with access to the storage media following granting of access to the storage media.

\* \* \* \* \*